US011314616B2

(12) United States Patent
M Y et al.

(10) Patent No.: US 11,314,616 B2
(45) Date of Patent: Apr. 26, 2022

(54) MACHINE LEARNING MODELS APPLIED TO INTERACTION DATA FOR FACILITATING MODIFICATIONS TO ONLINE ENVIRONMENTS

(71) Applicant: Adobe Inc., San Jose, CA (US)

(72) Inventors: Meghanath M Y, Pittsburgh, PA (US); Shankar Venkitachalam, Sunnyvale, CA (US); Deepak Pai, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 142 days.

(21) Appl. No.: 16/775,815

(22) Filed: Jan. 29, 2020

(65) Prior Publication Data
US 2021/0232478 A1 Jul. 29, 2021

(51) Int. Cl.
G06F 9/451 (2018.01)
G06F 11/34 (2006.01)
G06N 20/00 (2019.01)

(52) U.S. Cl.
CPC .......... *G06F 11/3438* (2013.01); *G06F 9/451* (2018.02); *G06N 20/00* (2019.01)

(58) Field of Classification Search
CPC .................................................. G06F 11/3438
See application file for complete search history.

(56) References Cited

U.S. PATENT DOCUMENTS 10,726,095 B1* 7/2020 Pallemulle .......... G06F 16/9535
2017/0148035 A1 5/2017 Yadagiri
2018/0336578 A1* 11/2018 Sato ................... G06Q 30/0201
2020/0186846 A1* 6/2020 Mishra .................... H04L 67/02

OTHER PUBLICATIONS

Thompson, Chris, "Buyer Persona Blueprint", Mintent market with intent, https://getmintent.com/blog/buyer-persona-blueprint/, Dec. 6, 2017, 8 pages.
Hubspot, Inc., "Use Lifecycle Stages", https://knowledge.hubspot.com/contacts/use-lifecycle-stages#what-is-the-difference-between-the-lifecycle-stage-and-lead-status-properties, Jan. 2, 2020, 3 pages.

(Continued)

*Primary Examiner* — Di Xiao
(74) *Attorney, Agent, or Firm* — Kilpatrick Townsend & Stockton LLP

(57) ABSTRACT

In some embodiments, a computing system identifies a current engagement stage of a user with an online platform by applying a stage prediction model based on interaction data associated with the user. The interaction data describe actions performed by the user with respect to the online platform and context data associated with each of the actions. The computing system further identifies one or more critical events for promoting the user to transition from one engagement stage to a higher engagement stage based on the interaction data associated with the user. The computing system can make the identified current engagement stage of the user or the identified critical event to be accessible by the online platform so that user interfaces presented on the online platform can be modified to improve a likelihood of the user to transit from the current stage to a higher engagement stage.

18 Claims, 7 Drawing Sheets

(56) References Cited

OTHER PUBLICATIONS

Abhishek, Vibhanshu, et al., "Media Exposure Through the Funnel: A Model of Multi-Stage Attribution", SSRN Electronic Journal, Aug. 17, 2012, 50 pages.

Vermunt, Jeroen K., et al., "Latent Class Analysis." The Sage Encyclopedia of Social Science Research Methods, Jan. 2004, 11 pages.

Linzer, Drew A., et al., "poLCA: An R Package for Polytomous Variable Latent Class Analysis" Journal of Statistical Software, vol. 42., Issue 10, Jun. 2011, 29 pages.

Visser, Ingmar, et al., "depmixS4: an R Package for Hidden Markov Models." Journal of Statistical Software, vol. 36, Issue 7, Aug. 2010, 21 pages.

Link, Henry C, "The New Psychology of Selling and Advertising", APA PsycNET, 1932, 2 pages.

Bither, Stewart W., Sheth , Jagdish N., "The Theory of Buyer Behavior." Journal of Marketing (pre-1986) 35.000001, 102, Jan. 1971, 12 pages.

Visentin, Marco, et al., "From Assessment to Purchase: A Three-Stage Model of the Marketing Funnel in Sponsorship Activities." Journal of Sport Management, vol. 30, Issue 6, Nov. 2016, 31 pages.

Bellman, Richard, et al., "Differential-Difference Equations", United States Air Force Project RAND, The RAND Corporation, Jan. 1963, 478 pages.

Bucklin, Randolph E., et al., "A Model of Web Site Browsing Behavior Estimated on Clickstream Data", Journal of Marketing Research, vol. 40, No. 3, Aug. 2003, 19 pages.

Chapelle, Olivier, et al., "Simple and Scalable Response Prediction for Display Advertising", ACM Transactions on Intelligent Systems and Technology (TIST) 5, 4, Article 61, Dec. 2014, 34 pages.

Chen, Min, et al., "Big data: A Survey", Mobile Networks and Applications. vol. 19, Issue 2, Apr. 2014, 39 pages.

Ghose, Anindya, "TAP: Unlocking the Mobile Economy", MIT Press, 2017, 4 pages.

Guo, Tian, et al., "Exploring Interpretable LSTM Neural Networks over Multi-Variable Data", arXiv preprint arXiv: 1905.12034, May 28, 2019, 17 pages.

Hidasi, Balazs, et al., "Session-Based Recommendations with Recurrent Neural Networks", arXiv preprint arXiv:1511.06939, Mar. 29, 2015, 10 pages.

Howard, John A., et al., "The Theory of Buyer Behavior", Journal of the American Statistical Association, Jan. 1969, 22 pages.

Karpathy, Andrej, et al., "Visualizing and understanding recurrent networks", arXiv preprint arXiv: 1506.02078, Nov. 17, 2015, 12 pages.

Korpusik, Mandy, et al., "Recurrent Neural Networks for Customer Purchase Prediction on Twitted", CBRec-Sys@ ReeSys 1673 (2016), Sep. 16, 2016, 4 pages.

Lang, Tobias, et al., "Understanding Consumer Behavior with Recurrent Neural Networks", Workshop on Machine Learning Methods for Recommender Systems, Computer Science, 2017, 8 pages.

Pai, Deepak, et al., "Modelling Visit Similarity Using Click-Stream Data: A Supervised Approach", In International Conference on Web Information Systems Engineering, Springer, Oct. 2014, 12 pages.

Chandramohan T N, Ravindran, "A Neural Attention Based Approach for Clickstream Mining", In Proceedings of the ACM India Joint International Conference on Data Science and Management of Data. ACM, Jan. 2018, 10 pages.

Sinha, Atanu R. et al., "Surveys Without Questions: A Reinforcement Learning Approach", The Thirty-Third AAAI Conference on Artificial Intelligence, 2019, 8 pages.

Srinivasan, Shuba, et al., "Paths to and off Purchase: Quantifying the Impact of Traditional Marketing and Online Consumer Activity", Journal of the Academy of Marketing Science, Mar. 2015, 15 pages.

Zhang, Liheng, et al., "Stock Price Prediction via Discovering Multi-Frequency Trading Patterns", In Proceedings of the 23rd ACM SIGKDD international conference on knowledge discovery and data mining, ACM, Aug. 2017, 10 pages.

Zhang, Yuyu, et al. "Sequential Click Prediction for Sponsored Search With Recurrent Neural Networks", In Twenty-Eighth AAAI Conference on Artificial Intelligence, Apr. 2014, 7 pages.

Guorui Zhou, et al., "Deep Interest Network for Click-Through Rate Prediction" In Proceedings of the 24th ACM SIGKDD International Conference on Knowledge Discovery & Data Mining. ACM, Jul. 2018, arXiv:1706.06978v4, Sep. 13, 2018, 9 pages.

\* cited by examiner

MACHINE LEARNING MODELS APPLIED TO INTERACTION DATA FOR FACILITATING MODIFICATIONS TO ONLINE ENVIRONMENTS

TECHNICAL FIELD

This disclosure relates generally to machine learning systems that facilitate modifying an interactive computing environment to enhance a user experience with content presented by an online platform. More specifically, but not by way of limitation, this disclosure relates to applying machine learning models to user interaction data for evaluating the user experience, identifying critical events for improving the experience, and, in some cases, performing experience-based modifications to interfaces for interacting with online environments.

BACKGROUND

Interactive computing environments, such as web-based applications or other online software platforms, allow users to perform various computer-implemented functions through graphical interfaces. A given interactive environment includes different graphical interfaces, each of which has a particular arrangement of available functionality or content. For instance, the interactive computing environment could present on a user device interface elements that search databases for different content items, interface elements that select the content items by storing them in a temporary memory location, or interface elements that cause a server to perform one or more operations on the combination of content items (e.g., creating a layered image, initiating a transaction to obtain a set of products, etc.).

Different users often have different experiences within the same type of interactive environment. For instance, different users having different levels of expertise with a particular application or online service may have varying levels of difficulty in reaching desirable outcomes via the application or online service. Such outcomes could include effectively performing desired functionality, efficiently locating desirable content, etc. Modifying the interactive environment of an online service to account for these different experiences could enhance the ability of any given user (or type of users) to utilize the online service as intended and thus increase the user's engagement level with the online service.

However, existing methods have limited capability to measure user experience with the interactive environment. The information utilized by the existing methods for measuring the user experience is only limited to high-level information, such as the number of web pages that a user viewed in a session. These methods fail to consider more detailed and valuable information embedded in the interactions of the users with the interactive environment and thus cannot provide accurate user experience measurement for effectively customizing the interactive environment.

SUMMARY

Certain embodiments involve applying machine learning models to interaction data for evaluating and thereby enabling modification of user interfaces for interacting with online platforms, such as electronic content delivery platforms. In one example, a computing device obtains interaction data associated with a user of an online platform. The interaction data describe actions performed by the user with respect to the online platform and context data associated with each of the actions. Based on the interaction data associated with the user, the computing device identifies a current engagement stage of the user with the online platform by applying a stage prediction model. The computing device further identifies one or more critical events for promoting the user to transition from one engagement stage to a higher engagement stage based on the interaction data associated with the user. The computing device causes user interfaces presented on the online platform to be modified to improve a likelihood of the user to transition from the current engagement stage to a higher engagement stage. The modification is based on the identified current engagement stage of the user or the identified critical event or both.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
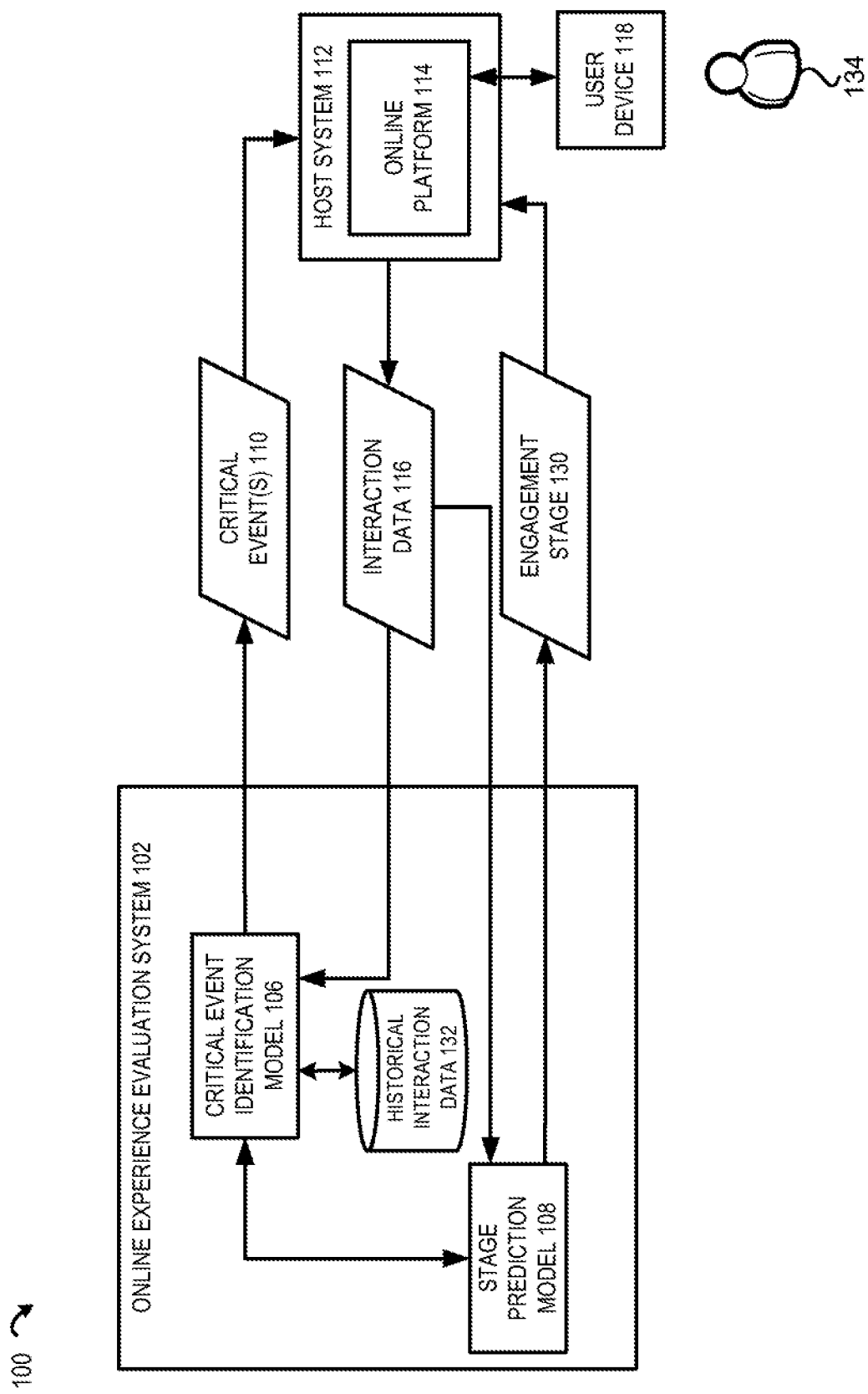
FIG. 1 depicts an example of a computing environment in which an online experience evaluation system can be used to evaluate and facilitate modifications to an online platform, according to certain embodiments of the present disclosure.

Certain embodiments involve applying machine learning models to interaction data for evaluating user experiences with respect to an online platform, such as an online content delivery platform, which can facilitate modifying one or more user interfaces provided by the online platform. For instance, an online experience evaluation system measures or estimates the user experience of a user, such as the engagement level or stage of the user, based on interaction data generated by the online platform including various details related to each interaction. To do so, the online experience evaluation system applies a machine learning model to the interaction data and thereby computes an interface experience metric. In one example, the interface experience metric could indicate the engagement level or stage of the user with respect to the online platform. In addition, the online experience evaluation system further identifies, based on the machine learning model, one or more critical events (e.g., viewing certain types of content) that can be used to increase the likelihood of the user to transition to a higher engagement level or stage. The online platform can be customized to a user (or otherwise modified) based on the engagement stage of the user and the critical events by, for example, modifying the user interfaces on the platform so that the engagement level of the user can be increased (e.g., by increasing the prominence of the content indicated by the critical events as promoting a user's transition to a higher engagement stage).

The following non-limiting example is provided to introduce certain embodiments. In this example, an online experience evaluation system, which is in communication with an online platform, executes one or more modeling algorithms that allow for enhancing interactive user experiences at the online platform. To do so, the environment evaluation system accesses interaction data from the online platform. The interaction data is generated by recording interactions that occur when user devices use one or more interfaces provided by the online platform. The interaction data also include the detailed context of each interaction (e.g., time of the interaction, content involved in the interaction, duration of the interaction, etc.). The online experience evaluation system applies a stage prediction model to the interaction data and computes the probability or propensity of the user performing a target action on the online platform given his past interaction with the online platform. The target action can represent a higher level of user engagement in the online platform than mere viewing the content or clicking on links of the online platform. Examples of the target action can include posting comments on a website hosted by the online platform, uploading images or videos on the online platform, or performing a transaction on the online platform.

Continuing with this example, the stage prediction model further determines the engagement stage of the user based on the computed probability or propensity of the user performing the target action. For example, the engagement stages of a user with respect to a website can include, from low to high, an awareness stage, an interest stage, a desire stage, and an action stage. At the awareness stage, the user becomes aware of the content of a website. At the interest stage, the user develops an interest in certain content of the website. At the desire stage, the user has a desire to obtain more related content on the website. At the action stage, the user performs the target actions on the website. Typically, a higher probability of performing the target action indicates that the user is at a higher level of engagement, and vice versa.

In addition to the engagement stage of the user, the online experience evaluation system further determines, based on the interaction data, one or more critical events that can be used to promote a user or a segment of users to transition from one engagement stage to a higher engagement stage. For example, if viewing the user comment page on a website significantly increases the probability of a user performing the target action of posting a comment, this event might be a critical event for the user. The website on the online platform can be modified to present the user comment page more prominently, thereby increasing the likelihood of the user transitioning to a higher engagement stage. The online experience evaluation system can identify the critical events based on the interaction data of the user or a collection of interaction data for a user segment.

The online experience evaluation system transmits or otherwise provides the identified engagement stage and the critical events to one or more computing systems that are used to host or configure the online platform. In some embodiments, providing the identified engagement level and the critical events to systems that host online platforms can allow various user interfaces of the interactive computing environment to be customized to particular users, modified to enhance the experience of certain types of users, or some combination thereof.

As described herein, certain embodiments provide improvements to interactive computing environments by solving problems that are specific to online platforms. These improvements include more effectively configuring the functionality of an interactive computing environment based on accurate and precise evaluations of user experience within the interactive computing environment. Facilitating these experience-based modifications involves identifying the engagement stage of a user and critical events for the user with respect to an interactive computing environment. This is particularly difficult in that the engagement stage of the user may be constantly changing depending on the content the user is viewing or the operations the user is performing or has performed. These ephemeral, rapidly transitioning stages makes it uniquely difficult to evaluate the user experience within an interactive computing environment.

Because these stage-evaluation problems are specific to computing environments, embodiments described herein utilize machine learning models and other automated models that are uniquely suited for assessing computing environments. For instance, a computing system automatically applies various rules of a particular type (e.g., various functions captured in one or more models, rules used to identify critical events) to interaction data and thereby computes objective measurements of online experience and critical events, sometimes in a real-time or near real-time manner. The objective measurements are usable for enhancing a computing environment by, for example, modifying interface elements or other interactive aspects of the environment. Using one or more models described herein can therefore allow for a more accurate and precise evaluation of what type of content are more likely to enhance the user experience with the online platform. Consequently, certain embodiments more effectively facilitate modifications to a computing environment that facilitate desired functionality, as compared to existing systems.

As used herein, the term "online platform" is used to refer to an interactive computing environment, hosted by one or more servers, that includes various interface elements with which user devices interact. For example, clicking, tapping or otherwise interacting with one or more interface elements during a session causes the online platform to manipulate electronic content, query electronic content, or otherwise interact with electronic content that is accessible via the online platform.

As used herein, the term "interaction data" is used to refer to data generated by one or more user devices interacting with an online platform that describes how the user devices interact with the online platform. For example, the interaction data for an interaction can include a description of the interactions, using, for example, the URL of the webpage the user interacted with, and context of the interaction, such as the date and time of the interaction, the duration of the interaction, the content involved in the interaction, and so on.

As used herein, the term "event" is used to refer to an operation performed by a user on the online platform. An event can include, for example, visiting a webpage A, or, in more detail, clicking on a link on webpage B, performing a search on webpage C, entering data on webpage D and so on. In some cases, an event can be represented using an identifier of the content (e.g., the URL) or an identifier of the type of content involved in the event.

As used herein, the term "event stream" or "sequence of events" is used to refer to a sequence of temporally ordered events extracted for a user from the interaction data. For example, an event stream for a user i is given by $E_{k_j}^i = \{e_1^i, e_2^i, e_3^i, \ldots, e_{k_j}^i\}$ where $k_1$ indicates the number of events corresponding to user i during a session. If the events are represented by the identifiers of the content or content types, the event stream can include a sequence of identifiers representing the content viewed or otherwise accessed by the user during the session.

As used herein, the term "contextual feature" is used to refer to the feature describing an aspect of the context when an interaction occurred. Examples of a contextual feature can include the time when the interaction happened, the date when the interaction occurred, the duration of the interaction, an object involved in the interaction, the quantity of the object, the value of the object, and so on. A contextual feature vector $\vec{c}_j^i$ can be generated for an event j associated with user i to include various contextual features associated with the event. Thus for the event stream $E_{k_j}^i$, a stream of contextual feature vectors can be created as $C_{k_j}^i = \{\vec{c}_1^i, \vec{c}_2^i, \vec{c}_3^i, \ldots, \vec{c}_{k_j}^i\}$.

As used herein, the term "engagement level" or "engagement stage" is used to refer to the level of engagement of the user in the online platform. For example, the engagement stages or levels of a user with respect to a website can include, from low to high, an awareness stage, an interest stage, a desire stage, and an action stage. At the awareness stage, the user becomes aware of the content of a website. At the interest stage, the user develops an interest in certain content of the website. At the desire stage, the user has a desire to obtain more related content on the website. At the action stage, the user performs the target actions on the website.

As used herein, the term "target action" is used to refer to an action performed by a user when the user is at a higher stage of engagement. For example, the target action can represent an action performed by the user when the user is at the action stage, such as posting comments on a website hosted by the online platform, uploading images or videos on the online platform, or performing a transaction on the online platform. A target action normally involves actions more than mere viewing the content or clicking on links of the online platform.

As used herein, the term "conversion" is used to refer to the transition of the user from a lower engagement stage to the action stage (i.e., the user performing the target action). The propensity of conversion for a user, also referred to as "conversion propensity," refers to the propensity of the user performing the target action. For example, the conversion propensity of a user at a given time can be calculated as the probability of the user performing the target action in the next event given the past events associated with the user.

As used herein, the term "critical event" is used to refer to an event that promoted or hampered a user or a segment of users to transition from one engagement stage to a higher engagement stage. For example, if viewing the user comment page on a website significantly increases the probability of a user performing the target action of posting a comment, this event might be a critical event for the user promoting the transition to a higher engagement stage.

As used herein, the term "criticality of an event" is used to refer to a quantity configured to measure how critical the event is in promoting a stage transition of the user. In one example, the criticality of an event is measured by the difference between the conversion propensities of the user with and without the event.

Referring now to the drawings, FIG. 1 depicts an example of computing environment 100 in which an online experience evaluation system 102 evaluates and, in some cases, facilitates modifications to user interfaces in an online platform 114 provided by a host system 112. In various embodiments, the computing environment 100 includes one or more of the online experience evaluation system 102 and the host system 112. The online experience evaluation system 102 can be configured to apply a trained stage prediction model 108 to interaction data 116 to identify an engagement stage 130 of a user 134 with respect to the online platform 114. The interaction data 116 can be generated by recording interactions between the online platform 114 and a user device 118 associated with the user 134. The online experience evaluation system 102 can further apply a critical event identification model 106 to interaction data 116 associated with the user and/or interaction data 132 for a segment of users to identify critical events 110.

The online experience evaluation system 102 provides the identified stage 130 and/or the critical events 110 to the host system 112. In some embodiments, providing the identified stage 130 and/or the critical events 110 to the host system 112 causes one or more features of the online platform, such as the user interfaces, to be changed such that subsequent interactive user experiences are enhanced for the user 134.

For example, the online experience evaluation system 102 receives interaction data 116 that is generated by a user device 118 interacting with the online platform 114. The interaction data 116 describes how the user device 118 interacted with the online platform 114. In some embodiments, the host system 112 could include one or more servers that log user activity in the online platform 114 and transmit, to the online experience evaluation system 102, the interaction data 116 describing the logged activity. In additional or alternative embodiments, a user device 118 could execute one or more services (e.g., a background application) that log user activity in the online platform 114 and transmit, to the online experience evaluation system 102, the interaction data 116 describing the logged activity.

In these various embodiments, logging the user activity includes, for example, creating records that identify a user entity (e.g., the user device 118 or a credential used to access the online platform 114), timestamps for various interactions that occur over one or more sessions with the online platform 114, the duration of the interactions, the status of online platform or website at the time of the interaction, and identifiers that characterize the interaction. Examples of identifiers include an identifier of the webpage that was visited (e.g., the URL), an identifier of a particular interface element that was clicked or otherwise used, and so on.

In some embodiments, the online experience evaluation system 102 determines the engagement stage 130 of the user 134 based on the interaction data 116. The online experience evaluation system 102 can employ a stage prediction model 108 to predict the engagement stage 130. To do so, the online experience evaluation system 102 can pre-process the interaction data 116 associated with the user 134 to generate an event stream. In some examples, the even stream can include a sequence of temporally ordered events extracted from the interaction data 116. In some implementations, the events are represented by the identifiers of the content or content types involved during the respective events. The event stream can thus include a sequence of identifiers representing the content viewed or otherwise accessed by the user during the session, such as the URL of the webpages visited by the user during the session.

In scenarios where the online platform 114 hosts a large amount of content (e.g., webpages), the number of identifiers can be large thereby increasing the complexity of the process for prediction the engagement stage of the user 134. To reduce the computational complexity, the online experience evaluation system 102 can classify the content of the online platform 114 into different categories and replace the identifier of the content with an identifier of the category. This classification process can significantly reduce the number of identifiers used to present the content visited by the user and thus the events involving the user. This can reduce the dimension of the input space and, consequently, the computational complexity of the process. For example, for an event stream {home page, item page A, item page B, item comparison page 1, item page D, item comparison page 2, transaction page}, after the classification, the event stream can become {home page, item page, item page, item comparison page, item page, item comparison page, transaction page}. The number of event identifiers is reduced from 7 to 4. For an online platform 114 hosting thousands of webpages many of which have the same type of content, the reduction can be significant.

In addition to the event stream, the online experience evaluation system 102 further can generate a contextual feature vector for each event in the event stream. The contextual feature vector for an event can include the contextual features associated with the event. Examples of contextual features include, but are not limited to, the date and time of the interaction, the duration of the interaction, the content involved in the interaction, the quantity of objects or other items mentioned in the content, the value of the objects or items, special features involved in presenting the content, and so on.

Based on the event stream and the corresponding stream of contextual feature vectors, the online experience evaluation system 102 employs the stage prediction model 108 to predict the engagement stage 130 of the user 134. For example, the online experience evaluation system 102 can provide the event stream along with the stream of contextual feature vectors to the stage prediction model 108 as input and obtain the prediction output generated by the stage prediction model 108. In some examples, the stage prediction model 108 can be configured to identify the current engagement stage of the user based on the event stream observed for this user so far. For example, the engagement stage of a user with respect to a website can include, from low to high, the awareness stage, the interest stage, the desire stage, and the action stage.

The stage prediction model 108 can determine the current engagement stage 130 of the user by determining the probability or propensity of the user performing a target action that would be performed by a user when the user is at the highest level of engagement. The probability or propensity is also referred to as the conversion probability or propensity. A higher probability or propensity of performing the target action indicates that the user is at a higher level of engagement, and vice versa. In some implementation, the stage prediction model 108 can estimate the conversion probability or propensity of the user by applying a recursive neural network (RNN), such as a long short-term memory (LSTM) network on the event stream and the stream of contextual feature vectors. Additional details regarding the identification of the engagement stage 130 for the user 134 are provided below with respect to FIGS. 2 and 3.

In addition to the engagement stage 130 of the user 134, the online experience evaluation system 102 can further employ a critical event identification model 106 to identify one or more critical events 110 for the user 134 or a segment of users. As discussed above, a critical event can be an event that promoted or hampered a user or a segment of users to transition from one engagement stage to a higher engagement stage. The critical event identification model 106 can identify the critical events 110 based on the interaction data 116 of the user and/or a collection of interaction data for a user segment i. The collection of interaction data can include historical interaction data 132 collected for the segment of users. The historical interaction data 132 can be stored in a database accessible to the critical event identification model 106. The historical interaction data 132 for a user segment can be updated when new interaction data 116 are received for users in the user segment.

In some examples, the critical event identification model 106 can determine, at the user level, the criticality of each event in the event stream of the user 134. For example, the determination can be made by measuring the difference between the conversion propensities of the user with and without the event. If the criticality of an event is higher than a threshold value of criticality, the event can be identified as a critical event; otherwise, it is a non-critical event. Alternatively, or additionally, a critical event can be identified at the user segment level based on the conversion propensities of the users in a user segment. Additional details about identifying critical events 110 are described below with regard to FIGS. 4-6.

The online experience evaluation system 102 may transmit the engagement stage 130 and/or the critical events 110 to the host system 112. In some embodiments, doing so causes the host system 112 to modify user interfaces or other properties of the online platform 114 based on the engagement stage 130 and/or the critical events 110. In one example, a development platform could rearrange the layout of an interface so that features or content associated with one or more of the critical events 110 that promote the user to transition from the engagement stage 130 to a higher stage are presented more prominently, features or content associated the critical events 110 that hamper the transition are presented less prominently, or some combination thereof. In various embodiments, the development platform performs these modifications automatically based on an analysis of the critical events 110 and/or the engagement stage 130, manually based on user inputs that occur subsequent to presenting the critical events 110 and the engagement stage 130, or some combination thereof.

In some embodiments, modifying one or more interface elements is performed in real time, i.e., during a session between the online platform 114 and a user device 118. For instance, an online platform 114 may be modified based on the interaction between the user device 118 and the online platform 114. If, during a session, a critical event 110 is identified that can promote the user transitioning to a higher stage of engagement, the online platform 114 could be modified to include the content involved in the critical event 110 in an effort to improve the user experience. The online experience evaluation system 102 can continue to evaluate the online experience during the session and thereby determine if additional changes to the interactive computing environment are warranted. In other embodiments, the interactive computing environment is modified after a given session is complete and the critical events 110 and the engagement stage 130 for the session are transmitted to the host system 112.

One or more computing devices are used to implement the online experience evaluation system 102 and the host system 112. For instance, the online experience evaluation system 102, the host system 112, or both could include a single computing device, a group of servers or other computing devices arranged in a distributed computing architecture, etc.

The online platform 114 can be any suitable online service for interactions with the user device 118. Examples of an online platform include a content creation service, an electronic service for entering into transactions (e.g., searching for and purchasing products for sale), a query system, etc. In some embodiments, one or more host systems 112 are third-party systems that operate independently of the online experience evaluation system 102 (e.g., being operated by different entities, accessible via different network domains, etc.). In additional or alternative embodiments, one or more host systems 112 include an online experience evaluation system 102 as part of a common computing system.

The user device 140 may be any device that is capable of accessing an online service. For non-limiting examples, user device 140 may be a smartphone, smart wearable, laptop computer, desktop computer, or other type of user device.

Figure 2:
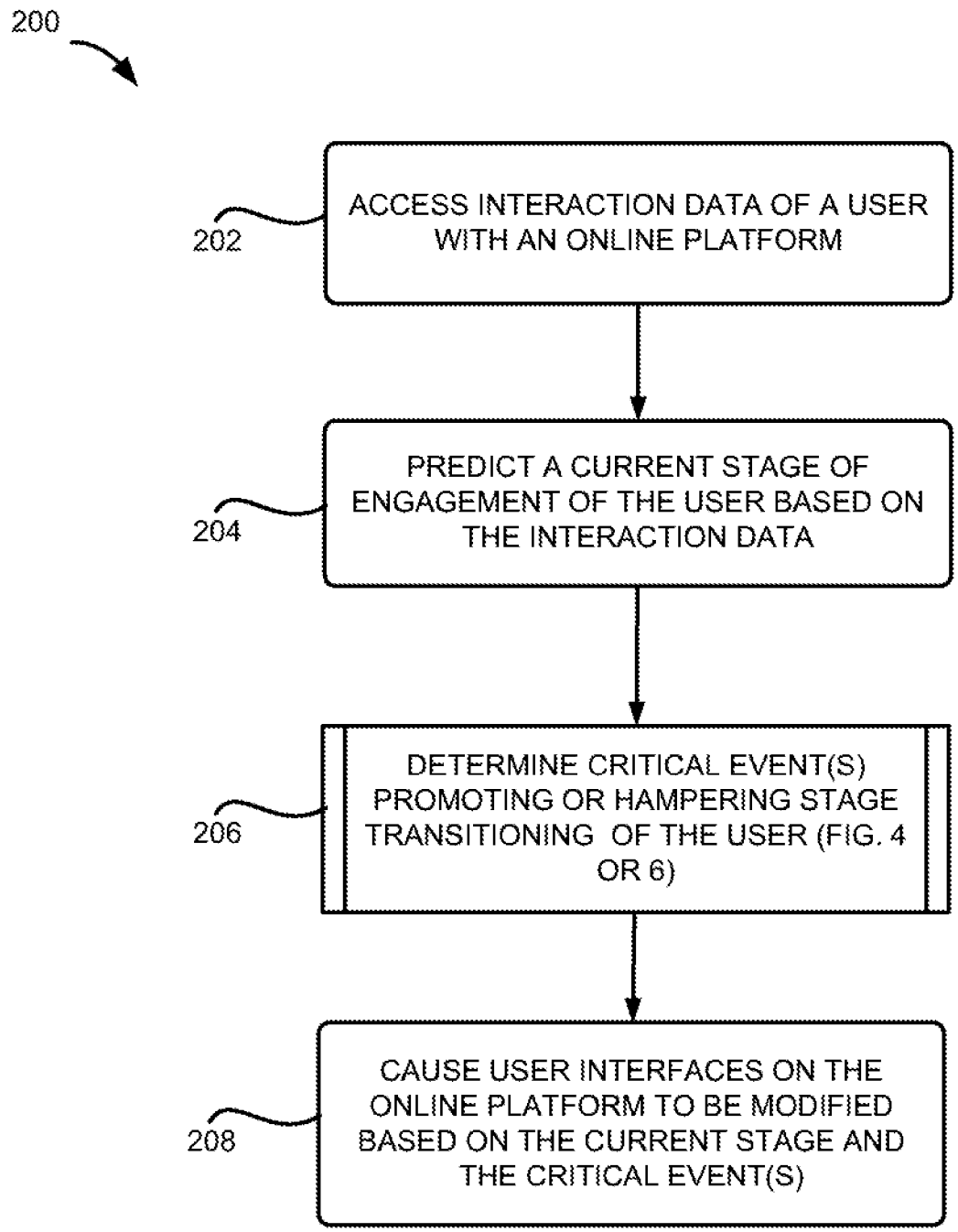
FIG. 2 depicts an example of a process for facilitating the modification of an online platform based on measured user experience, according to certain embodiments of the present disclosure.

FIG. 2 depicts an example of a process 200 for facilitating the modification of an online platform based on a user's engagement stage 130 and/or critical events 110, according to certain embodiments of the present disclosure. One or more computing devices (e.g., the online experience evaluation system 102) implement operations depicted in FIG. 2 by executing suitable program code. For illustrative purposes, the process 200 is described with reference to certain examples depicted in the figures. Other implementations, however, are possible.

At block 202, the process 200 involves accessing interaction data 116 associated with a user 134 from an online platform 114. For instance, interactions between a user device 118 associated with the user 134 and an online platform 114 may create interaction data 116. The online experience evaluation system 102 accesses interaction data 116 from a suitable non-transitory computer-readable medium or other memory device. In some embodiments, interaction data 116 is stored on one or more non-transitory computer-readable media within the host system 112. The online experience evaluation system 102 accesses the interaction data 116 via suitable communications with a host system 112 (e.g., a push or batch transmission from the host system 112, a pull operation from the online experience evaluation system 102, etc.). In additional or alternative embodiments, the online experience evaluation system 102 and the host system 112 are communicatively coupled to a common data store (e.g., a set of non-transitory computer-readable media, a storage area network, etc.). The online experience evaluation system 102 retrieves the interaction data 116 from the data store after the host system 112 stores the interaction data 116 in the data store. In additional or alternative embodiments, interaction data 116 is stored at user devices 118 and transmitted to the online experience evaluation system 102 directly, without involving the host system 112. For instance, a background application on each user device 118 could transmit a set of interaction data 116 for that user device 118 to the online experience evaluation system 102.

At block 204, the process 200 involves predicting a current engagement stage 130 of the user 134 based on the interaction data 116. The online experience evaluation system 102 can employ a stage prediction model 108 to predict the engagement stage 130. In some examples, the online experience evaluation system 102 can pre-process the interaction data 116 associated with the user 134 to generate an event stream. For example, an event stream for a user i can be given by $E_{k_j}^i = \{e_1^i, e_2^i, e_3^i, \ldots, e_{k_j}^i\}$ where $k_j$ indicates the number of events corresponding to user i during a session. In some implementations, the events are represented by the identifiers of the content involved during the respective events. The event stream can thus include a sequence of identifiers representing the content viewed or otherwise accessed by the user during the session, such as the URL of the webpages visited by the user during the session. As discussed above, the online experience evaluation system 102 can reduce the number of identifiers by classifying the content identifiers into high-level categories, such as classifying all webpages describing a product as a product page category. The identifier of the content can thus be replaced with an identifier of the category of the content.

In addition to the event stream, the online experience evaluation system 102 further can generate a contextual feature vector $\vec{c}_j^i$ for each event j in the event stream $E_{k_j}^i$. The contextual feature vector for an event can include the contextual features associated with the event. The stream of contextual feature vectors for the event stream $E_{k_j}^i$ can be denoted as $C_{k_j}^i = \{\vec{c}_1^i, \vec{c}_2^i, \vec{c}_3^i, \ldots, \vec{c}_{k_j}^i\}$.

Figure 3:
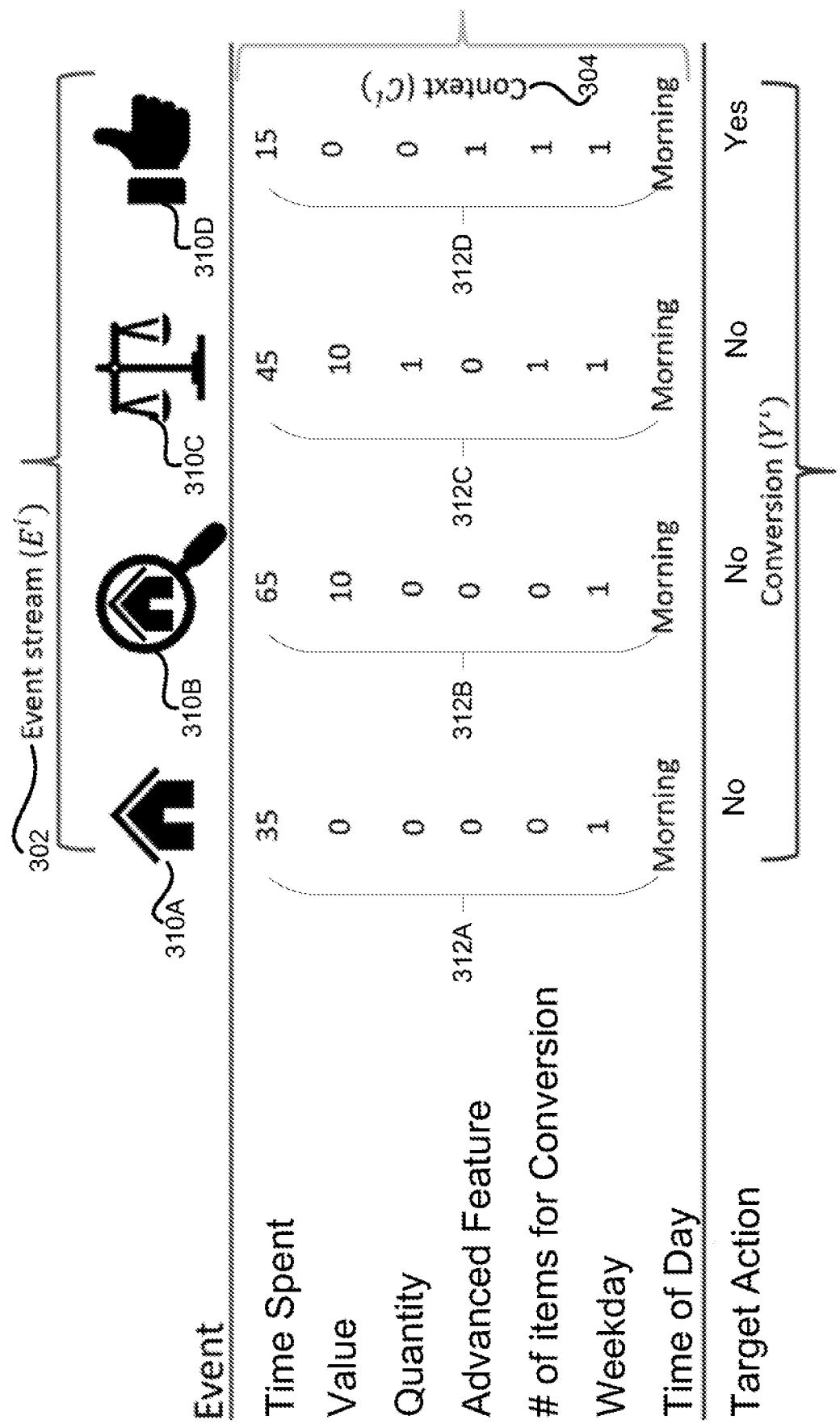
FIG. 3 depicts an example of data attributes used by the online experience evaluation system to predict the user experience, according to certain embodiments of the present disclosure.

FIG. 3 depicts an example of an event stream 302 and the stream of contextual feature vectors 304 associated with the event stream 302 and used by the online experience evaluation system 102 to predict the engagement stage 130, according to certain embodiments of the present disclosure. In this example, the event stream $E_4^i$ includes four events 310A-D represented in FIG. 3 using the icons of the respective categories of the content visited by the user in the respective events. The four events include, in the temporal order, a visit to the home page 310A, a visit to an item page describing an item 310B (e.g., a product), a visit to an item comparison page 310C (e.g., for comparing two products), and a visit to an action confirmation page 310D indicating a target action (e.g., a purchase transaction) has been performed.

FIG. 3 also shows the stream of contextual feature vectors 312A-312D associated with the four events 310A-310D in the event stream $E_4^i$. The contextual features in each of the four contextual feature vectors includes the time spent for each event, the time of the day when the event occurred, whether the event occurred on a weekday, the value and quantity of items shown in the event content, the number of items for conversion, and whether any advance feature was used when presenting the content. FIG. 3 further shows whether the user has converted (i.e., performed the target action) after each event in $E_{k_j}^i$.

Referring back to FIG. 2, based on the event stream and the stream of contextual feature vectors generated by pre-processing the interaction data 116, the stage prediction process can be more formally formulated as follows. Assume the event stream for a user i is given by $E_{k_j}^i = \{e_1^i, e_2^i, e_3^i, \ldots, e_{k_j}^i\}$ where the events are temporally ordered, $k_1$ indicates the number of events corresponding to user i during a session. $Y_{k_j}^i = \{y_1^i, y_2^i, y_3^i, \ldots, y_{k_j}^i\}$ is a vector of length $k_j$ that denotes whether user i has performed the target action after each event in $E_{k_j}^i$ ($y_j^i = 1$ if the user coverts; 0 otherwise). To model the conversion probability $P(y_{k_j}^i | E_{k_j}^i)$ the event stream can be further enriched with the stream of contextual feature vectors $C_{k_j}^i = \{\vec{c}_1^i, \vec{c}_2^i, \vec{c}_3^i, \ldots, \vec{c}_{k_j}^i\}$. The conversion probability or propensity can thus be modeled as $P(y_{k_j}^i | E_{k_j}^i, C_{k_j}^i)$. In one example, $P(y_{k_j}^i | E_{k_j}^i, C_{k_j}^i)$ is modeled as a binary classification problem minimizing the loss after each event in $E_{k_j}^i$. In some implementations, a machine learning model can be employed to solve this binary classification problem. For instance, an RNN, such as a one-directional multi-variable LSTM, can be utilized to predict $P(y_{k_j}^i | E_{k_j}^i, C_{k_j}^i)$ given the sequential nature of the event streams.

The estimated conversion probability or conversion propensity can thus be utilized to determine the current engagement stage 130 of the user 134. In some examples, the distributions of these predicted conversion probabilities or conversion propensities across multiple users after each event are utilized to identify the corresponding quantile value for different quantiles for different stages. In the above example where the user can be in four stages including the awareness stage, the interest stage, the desire stage, and the action stage, the three different quantiles for these four stages can be set to be x for awareness stage, y for interest stage, and z for desire stage. In one example, x is 50%, y is 75%, and z is 87.5%. The inherent assumption here is that only half of the users in each stage progress to the next stage. The x, y and z can be configured to take other values, such as 50%, 75% and 97.5%, respectively. Depending on the corresponding purchase probabilities, each user can then be assigned a customer stage.

At block 206, the process 200 involves determining critical events 110 that promote or hamper the stage transitioning of the user. In some examples, the online experience evaluation system 102 employs a critical event identification model 106 to identify the critical events 110. The critical event identification model 106 can determine the critical events 110 at the user level based on the interaction data 116 of the user 134, such as the event stream and associated contextual features. Alternatively, or additionally, the critical event identification model 106 can determine the critical events 110 at a user segment level based on the interaction data for users in a user segment, such as the historical interaction data 132 for these users. Additional details regarding determining the critical events 110 are presented below with respect to FIGS. 4-6.

At block 208, the process 200 involves causing the online platform 114 to be modified based on the determined engagement stage 130 and/or the critical events 110. For example, the online experience evaluation system 102 can transmit the engagement stage 130 and/or the critical events 110 to the host system 112 via a local area network, a wide area network, or some combination thereof. Based on the received engagement stage 130 and/or critical events 110, the host system 112 can modify interface elements on the user interfaces (e.g., webpages), the order of presenting the user interfaces, or other aspects of the online platform 114. In one example, an interface element may include, but is not limited to, visual content, such as colors and layout, available click actions in certain click states, and design features, such as menus, search functions, and other elements. In some embodiments, the user interfaces may be modified in a manner that increases the likelihood of the user transitioning from the current engagement stage to a higher engagement stage. For example, if a critical event for promoting the stage transition involves a "deal page," the host system 112 can cause the online platform 114 to include better deals in the deal page for the user so as to increase the likelihood of the user making a stage transition to a higher engagement stage.

Figure 4:
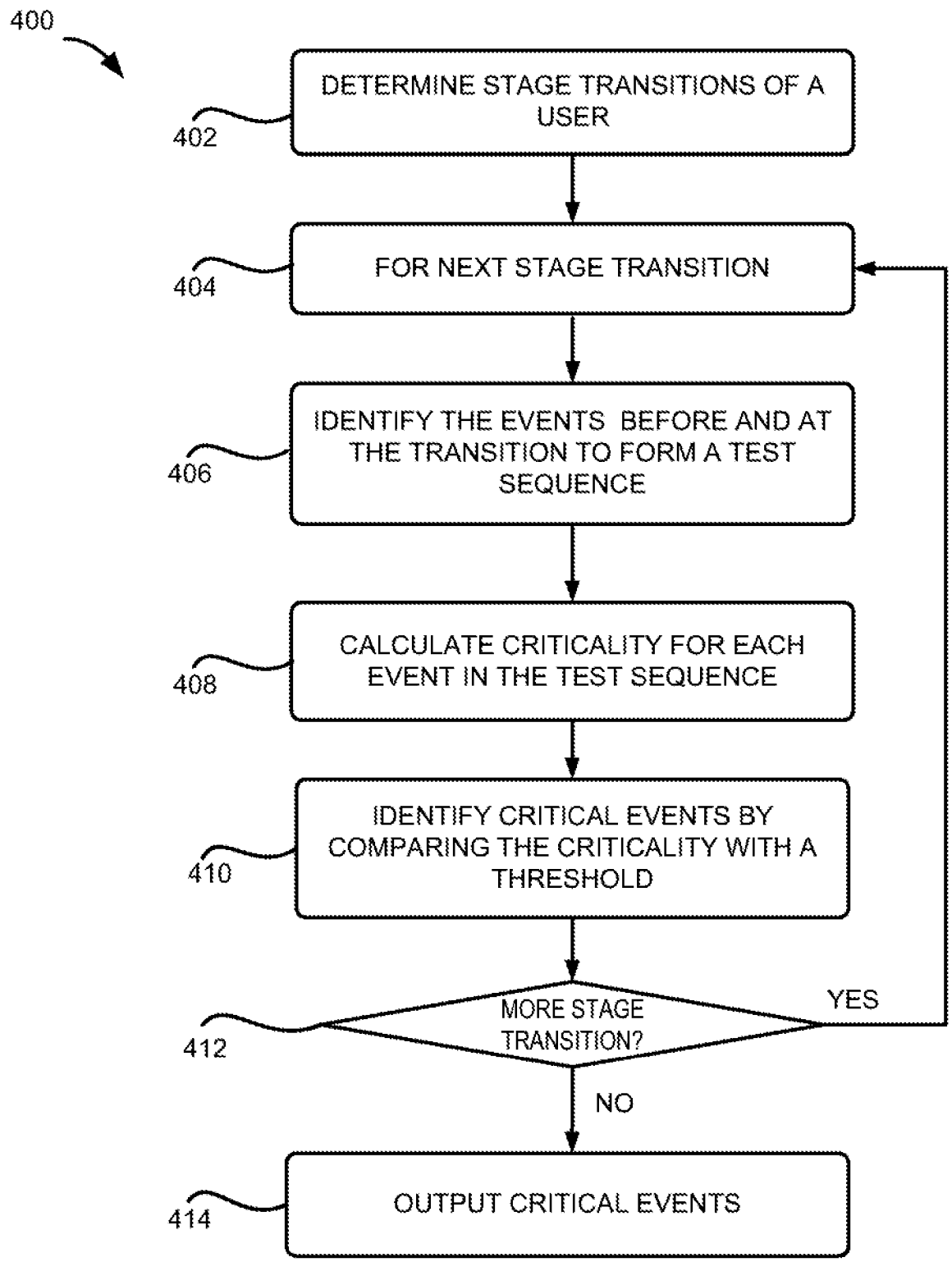
FIG. 4 depicts an example of a process for determining critical event(s) for improving the user experience, according to certain embodiments of the present disclosure.

FIG. 4 depicts an example of a process 400 for determining critical events 110 at the user level based on the interaction data 116 of the user, according to certain embodiments of the present disclosure. One or more computing devices (e.g., the online experience evaluation system 102) implement operations depicted in FIG. 4 by executing suitable program code (e.g., the critical event identification model 106). For illustrative purposes, the process 400 is described with reference to certain examples depicted in the figures. Other implementations, however, are possible.

At block 402, the process 400 involves determining stage transitions of the user 134. The critical event identification model 106 can utilize the stage prediction model 108 to estimate the engagement stage of the user at each event in the event stream. For example, for the event stream $E_{k_j}^i = \{e_1^i, e_2^i, e_3^i, \ldots, e_{k_j}^i\}$, the critical event identification model 106 can generate an event stream $E_l^i = \{e_1^i, e_2^i, \ldots, e_l^i\}$ for each event $l$, $1 \leq k_j$ and input the event stream $E_l^i$ to the stage prediction model 108 to predict the engagement stage of the user when event $l$ occurred. Denoting the predicted engagement stage of the user at event $l$ as $S_l$, a sequence of engagement stages of the user becomes $\{S_1, S_2, \ldots, S_{k_j}\}$. A stage transition occurs when $S_l \neq S_{l-1}$.

Figure 5:
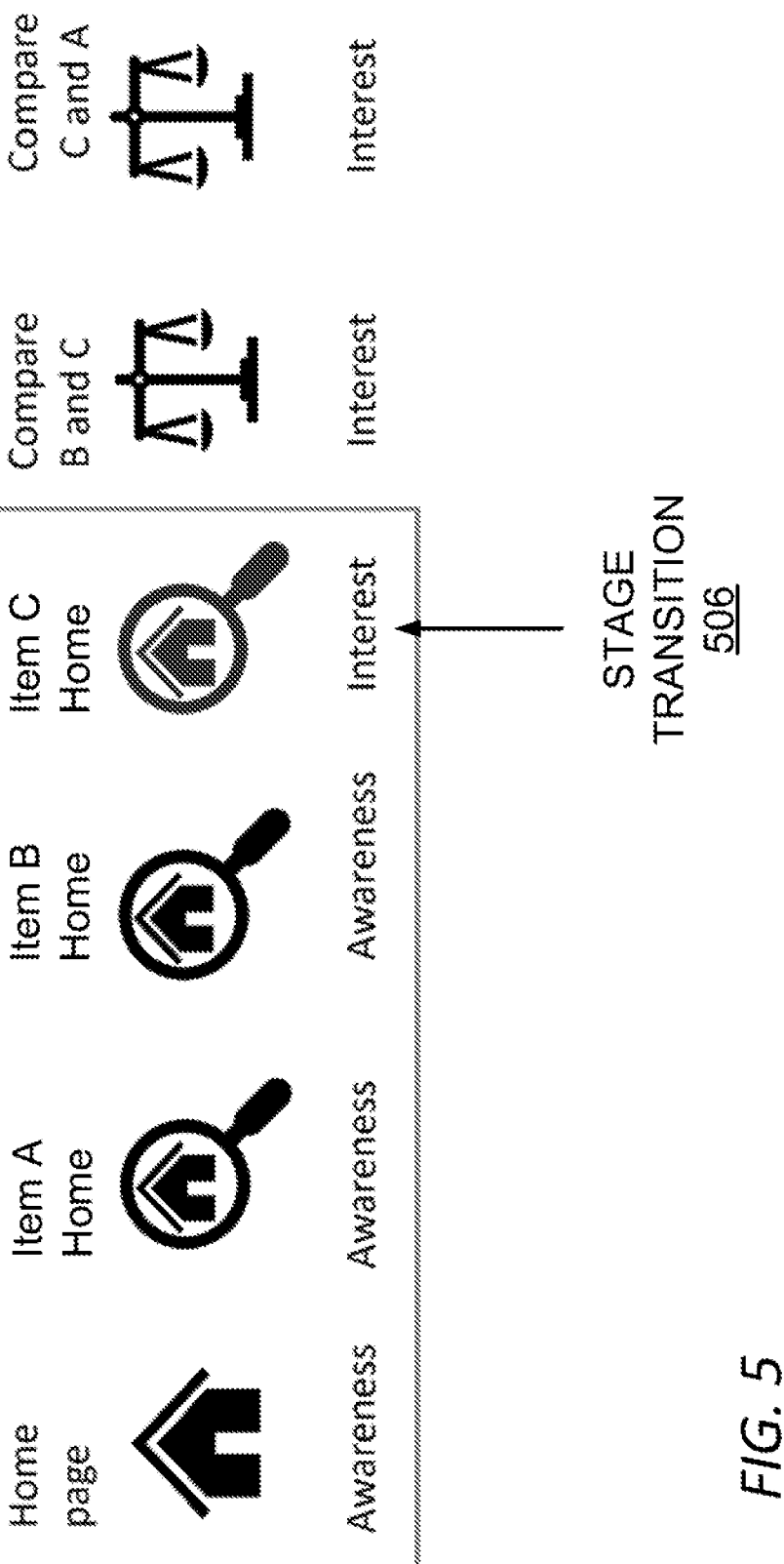
FIG. 5 depicts an example of identifying a test sequence from an event stream for a stage transition according to certain embodiments of the present disclosure.

For instance, FIG. 5 shows an example of an event stream 502 and the engagement stage associated with each event in this event stream. In this example, the event stream 502 includes six events: visiting a home page event, visiting item A home page, visiting item B home page, visiting item C home page, visiting a comparison page for B and C, and visiting a comparison page for C and A. The engagement stage predicted for the first three events is the awareness stage, and the engagement stage predicted for the last three events is the interest stage. A stage transition 506 occurs at the fourth event where the user transitions from the awareness stage to the interest stage when visiting the item C home page.

Returning to FIG. 4, at block 404, the process 400 involves accessing the next stage transition of the identified state transitions. At block 406, the process 400 involves identifying events before and at the stage transition to form a test sequence. For example, if a stage transition for user i occurred at event t, the test sequence becomes $E_t^i = \{e_1^i, e_2^i, \ldots, e_t^i\}$. In the example shown in FIG. 5, the test sequence 504 for the stage transition 506 includes the first three events that are before the stage transition 506, and the fourth event where the stage transition 506 occurred.

At block 408, the process 400 involves calculating the criticality of each event in the test sequence. The criticality of an event describes how critical the event is in promoting a stage transition of the user. In one example, the criticality of an event can be measured by the difference between the conversion propensity difference of the user with and without the event (counterfactual case). The conversion propensity of a user with regard to an event refers to the propensity or probability of the user transitioning into the action stage after the event occurs. The conversion propensity difference of the user at an event can be determined as the difference between the conversion propensities of the user after the event occurred and before the event occurred.

Considering an event m in the test sequence (m≤t), a subset of test sequence for the event m can include $E_m^i = \{e_1^i, e_2^i, \ldots, e_m^i\}$. As discussed above, the conversion propensity of user i after event m occurred, denoted as $P(y_m^i = 1 | \{E_m^i, C_m^i\})$, can be predicted using the stage prediction model 108. Similarly, the conversion propensity of user i before event m occurs, denoted as $P(y_{m-1}^i=1|\{E_{m-1}^i, C_{m-1}^i\})$, can be also predicted using the stage prediction model 108. The conversion propensity difference of the user at event m, denoted as $L(e_m^i)$, can be calculated as:

$$L(e_m^i) = P(y_m^i=1|\{E_m^i, C_m^i\}) - P(y_{m-1}^i=1|E_{m-1}^i, C_{m-1}^i) \quad (1)$$

Next, consider the counterfactual case where event m is absent from the event stream. In this case, event m+1 becomes the next event after event m−1 occurred. The conversion propensity difference of the user in this counterfactual case, denoted as $L(e_m^{i*})$, becomes:

$$L(e_m^{i*}) = P(y_{m+1}^i=1|\{E_{m+1}^i \backslash e_m^i, C_{m+1}^i \backslash c_m\}) - P(y_{m-1}^i=1|E_{m-1}^i, C_{m-1}^i). \quad (2)$$

Based on the conversion propensity differences of the user with and without event m in the event stream, the criticality of event m can be calculated as:

$$Q(e_m^i) = L(e_m^i) - L(e_m^{i*}). \quad (3)$$

Intuitively, if $Q(e_m^i)$ is positive, it can mean that the event m is critical in increasing the user's conversion propensity. On the other hand, if $Q(e_m^i)$ is negative, it can mean that the event m was detrimental and hampered the conversion of the user i.

In the example shown in FIG. 5, to calculate the criticality of the third event ("item B home page"), the critical event identification model 106 can first calculate the first conversion propensity difference $L(e_3^i)$ as $P(y_3^i=1|\{e_1^i, e_2^i, e_3^i\}, \{c_1^i, c_2^i, c_3^i\}) - P(y_2^i=1|\{e_1^i, e_2^i\}, \{c_1^i, c_2^i\})$. The counterfactual conversion propensity difference $L(e_3^{i*})$ can be calculated as $P(y_3^i=1|\{e_1^i, e_2^i, e_4^i\}, \{c_1^i, c_2^i, c_4^i\}) - P(y_2^i=1|\{e_1^i, e_2^i\}, \{c_1^i, c_2^i\})$. The criticality of the third event thus can be calculated as $Q(e_3^i) = L(e_3^i) - L(e_3^{i*})$. Similarly, the criticality of fourth event ("item C home") can be calculated as $$Q(e_4^i) = L(e_4^i) - L(e_4^{i*}) = P(y_3^i = 1|\{e_1^i, e_2^i, e_3^i, e_4^i\}, \{c_1^i, c_2^i, c_3^i, c_4^i\}) - \quad (4)$$
$$P(y_2^i = 1|\{e_1^i, e_2^i, e_3^i\}, \{c_1^i, c_2^i, c_3^i\}) -$$
$$(P(y_3^i = 1|\{e_1^i, e_2^i, e_3^i, e_5^i\}, \{c_1^i, c_2^i, c_3^i, c_5^i\}) -$$
$$P(y_2^i = 1|\{e_1^i, e_2^i, e_3^i\}, \{c_1^i, c_2^i, c_3^i\})).$$

Returning to FIG. 4, at block 410, the process 400 involves identifying critical events based on the criticality of the events in the test sequence. The criticalities of the events can be compared with a threshold value of criticality to determine the critical events. For example, as discussed above, the threshold value of criticality can be set to be zero so that an event whose criticality is above zero can be identified as the critical event for promoting the stage transition to a higher stage and an event whose criticality is below zero can be identified as the critical event for hampering the stage transition. In other examples, the threshold can be set to a positive value α such that an event whose criticality is above α can be identified as the critical event for promoting the stage transition and an event whose criticality is below −α can be identified as the critical event for hampering the stage transition. Other threshold values of criticality can also be utilized.

At block 412, the process 400 involves determining whether there are more stage transitions in the event stream. If so, the process 400 involves accessing the next stage transition at block 404 and repeating the above process for the next stage transition. If there are no more stage transitions, process 400 involves outputting the identified critical events at block 414.

Figure 6:
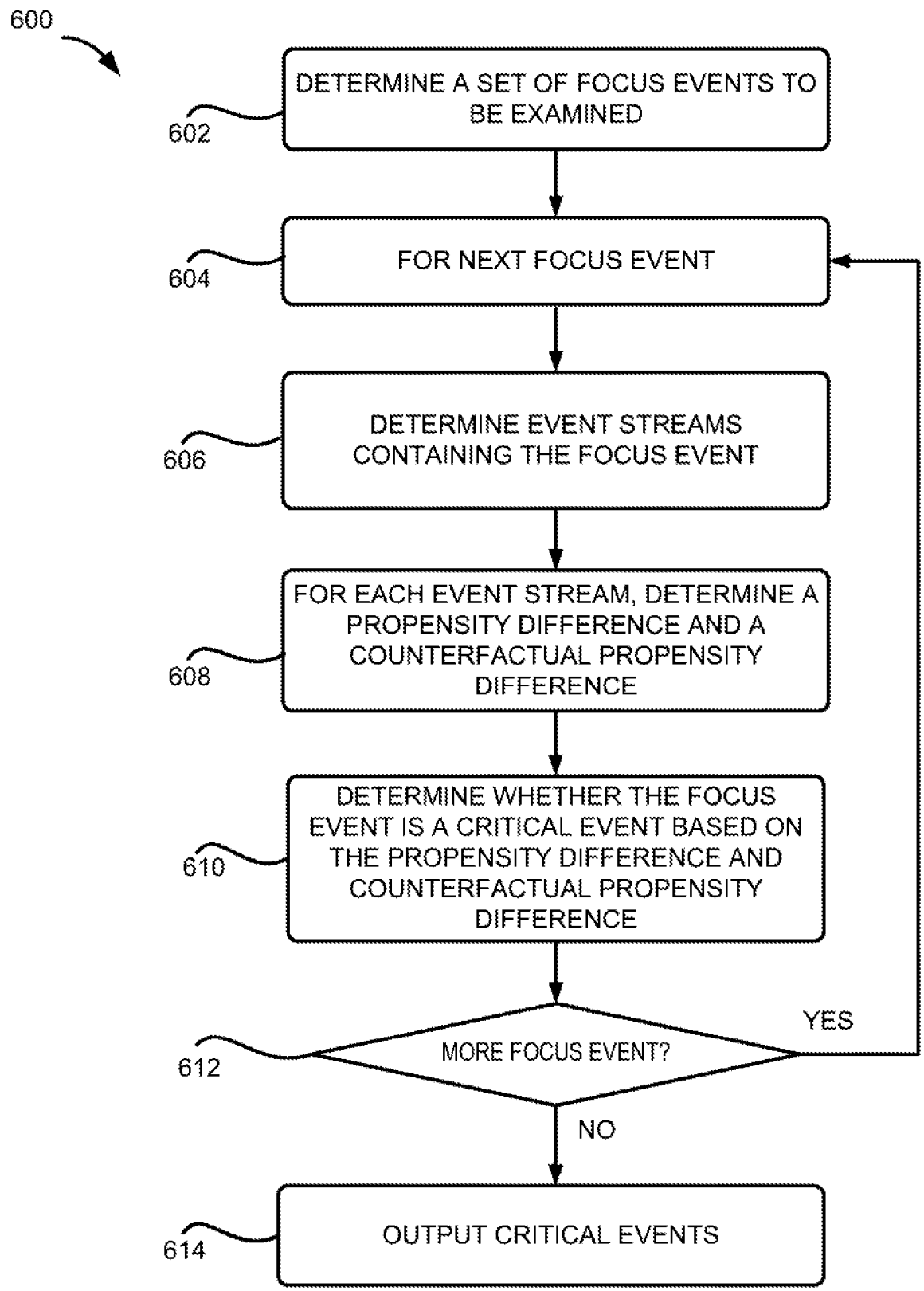
FIG. 6 depicts another example of a process for determining critical event(s) for improving the user experience, according to certain embodiments of the present disclosure.

Because the criticality $Q(e_m^i)$ determined as described above is based on the interaction data 116 of the user 134, the criticality of events and thus the critical events are identified at the user level. In other examples, the criticality of events can be identified at a user segment level. FIG. 6 depicts an example of a process 600 for determining critical events 110 based on interaction data of users in a user segment of the user, according to certain embodiments of the present disclosure. One or more computing devices (e.g., the online experience evaluation system 102) implement operations depicted in FIG. 6 by executing suitable program code (e.g., the critical event identification model 106). For illustrative purposes, process 600 is described with reference to certain examples depicted in the figures. Other implementations, however, are possible.

At block 602, the process 600 involves determining a set of events from which critical events are to be identified. The set of events can also be referred to as the set of focus events. These focus events can include, for example, the events in the test sequences identified at block 406 of FIG. 4. The focus events can also include events that are detected from the event streams of other users, events specified through user inputs, such as by an administrator of the online platform 114, or other types of events.

At block 604, the process 600 involves accessing the next focus event f from the set of focus events. At block 606, the process 600 involves identifying event streams that contain the focus event f. The critical event identification model 106 can analyze the historical interaction data 132 to determine the event streams of users in the user segment and examine each event stream to determine if the event stream contains the focus event f. Denote the set of users in the user segments whose event streams contain the focus event f as $U_f$. At block 608, the process 600 involves, for each event stream $E_{k_i}^i = \{e_1^i, e_2^i, e_3^i, \ldots, e_{k_i}^i\}$ that contains the focus event f, where $i \in U_f$, determining a propensity difference $L(e_f^i)$ at the event f and a corresponding counterfactual propensity difference $L(e_f^{i*})$ as described above with respect to block 408 of FIG. 4. The generated $\{L(e_f^i)\}$ and $\{L(e_f^{i*})\}$ each forms a distribution.

At block 610, the process 600 involves determining whether the focus event f is a critical event based on the two distributions $\{L(e_f^i)\}$, $i \in U_f$ and $\{L(e_f^{i*})\}$, $i \in U_f$. In some examples, a hypothesis testing can be formulated for $L(e_f^i)$ and $L(e_f^{i*})$ to determine whether event f is a critical event. For example, two one-sided alternative paired t-test can be formulated to assess the difference in means between $L(e_f^i)$ and $L(e_f^{i*})$ as follows:

$$H_0: L(e_f^i) \leq L(e_f^{i*});$$

$$H_{A_1}: L(e_f^i) < L(e_f^i);$$

reject Null if event f is a critical event and promotes stage transition and conversion.

$$H_0: L(e_f^i) \geq L(e_f^{i*});$$

$$H_{A_2}: L(e_f^i) < L(e_f^{i*});$$

reject Null if event f is a critical event and hampers stage transition and conversion.

As discussed above, $L(e_f^i)$ and $L(e_f^{i*})$ can capture the changes of user conversion propensities of an event when the event is present and in the counterfactual when it is absent. Comparing the means of $L(e_f^i)$ and $L(e_f^{i*})$ can determine if the given event f is a critical event across a user segment.

At block 612, the process 600 involves determining if there are more focus events to be analyzed. If so, process 600 involves, at block 604, accessing the next focus event and repeat the above process to determine whether the next focus event is a critical event. If there are no more focus events to be analyzed, the process 600 involves outputting the critical events at block 614.

Example of a Computing System for Implementing Certain Embodiments

Figure 7:
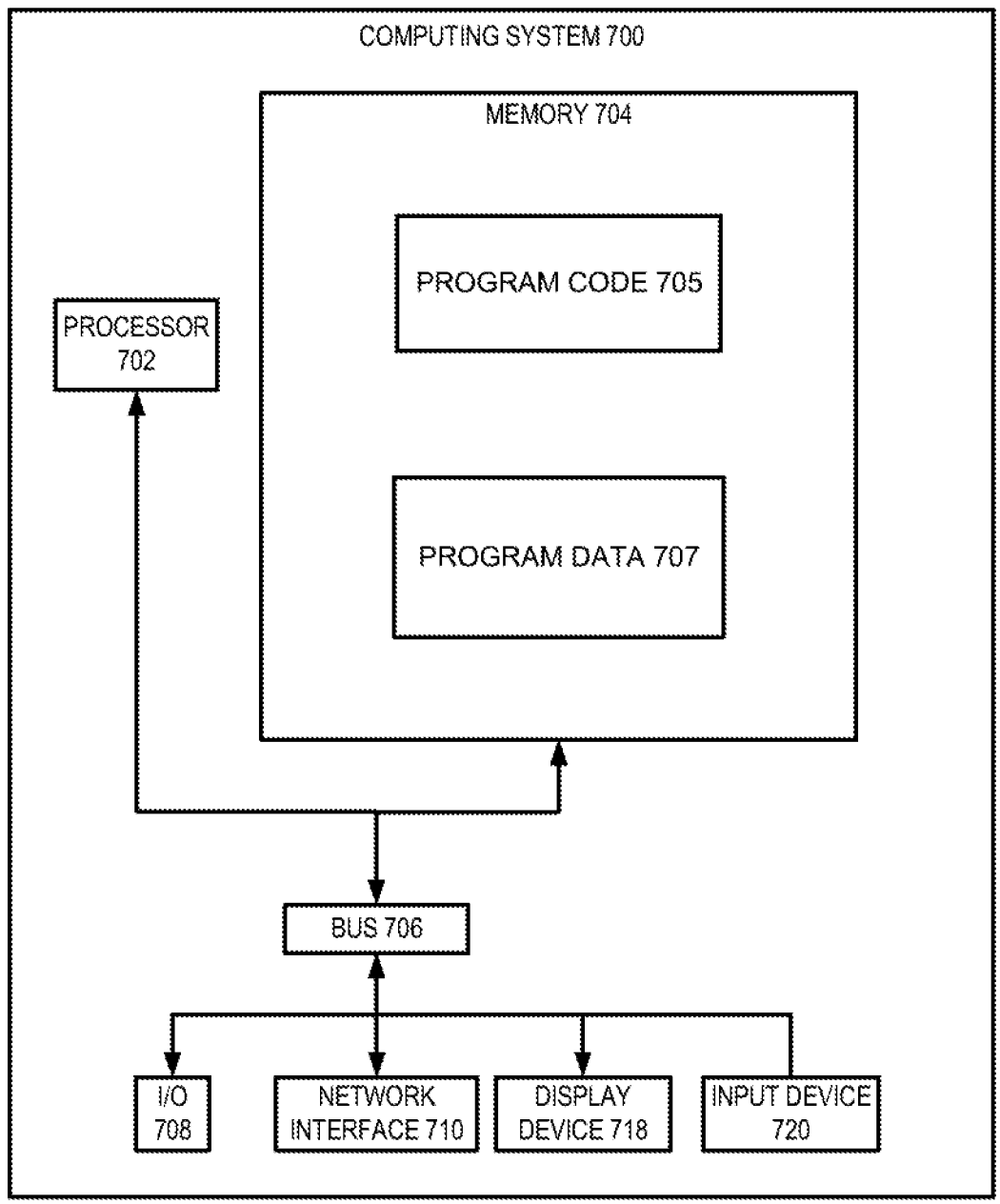
FIG. 7 depicts an example of a computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of an online experience evaluation system 102 and a host system 112. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, an input device 720, a presentation device 718, or other input or output devices. An I/O interface 708 can receive input from input devices or provide output to output devices. One or more buses 706 are also included in the computing system 700. The bus 706 communicatively couples one or more components of a respective one of the computing system 700.

The computing system 700 executes program code 705 that configures the processor 702 to perform one or more of the operations described herein. Examples of the program code 705 include, in various embodiments, modeling algorithms executed by the online experience evaluation system 102 (e.g., functions of the critical event identification model 106, and/or the stage prediction model 108), the online platform 114, or other suitable applications that perform one or more operations described herein (e.g., one or more development applications for configuring the online platform 114). The program code may be resident in the memory device 704 or any suitable computer-readable medium and may be executed by the processor 702 or any other suitable processor.

In some embodiments, one or more memory devices 704 stores program data 707 that includes one or more datasets or data attributes, and models described herein. Examples of these datasets or data attributes, include interaction data, experience metrics, training interaction data or historical interaction data, transition importance data, etc. In some embodiments, one or more of datasets, data attributes, models, and functions are stored in the same memory device (e.g., one of the memory devices 704). In additional or alternative embodiments, one or more of the programs, data sets, models, and functions described herein are stored in different memory devices 704 accessible via a data network.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an online experience evaluation system 102) via a data network using the network interface device 710.

In some embodiments, the computing system 700 also includes the input device 720 and the presentation device 718 depicted in FIG. 7. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the online experience evaluation system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for causing an interactive computing environment hosted by an online platform to be modified, where the computer-implemented method causes one or more processing devices to perform operations comprising:
    obtaining interaction data associated with a user of an online platform, the interaction data describing actions performed by the user with respect to the online platform and context data associated with each of the actions;
    identifying a current engagement stage of the user with the online platform by applying a stage prediction model based on the interaction data associated with the user, wherein the stage prediction model is configured to generate a propensity of the user being at a highest engagement stage, and wherein the current engagement stage of the user is determined based on the propensity;
    identifying one or more critical events for promoting the user to transition from one engagement stage to a higher engagement stage based, at least in part, upon the interaction data associated with the user; and
    causing user interfaces presented on the online platform to be modified based on at least one of the identified current engagement stage of the user or the identified one or more critical events to improve a likelihood of the user to transition from the current engagement stage to a higher engagement stage.

2. The method of claim 1, further comprising:
    pre-processing the interaction data to generate an event stream that comprises a sequence of events corresponding to the actions performed by the user with respect to the online platform and contextual features associated with each event in the sequence of events.

3. The method of claim 2, wherein identifying one or more critical events comprises:
    determining an engagement stage of the user associated with each event in the sequence of events;
    determining a stage transitioning event in the sequence of events for the user by identifying an event that is associated with a first stage and whose previous event is associated with a second stage, wherein the first stage and the second stage are different;
    forming a test sequence by including, at least, the stage transitioning event and a plurality of events that associated with the second stage;
    determining a criticality for each event in the test sequence by applying the stage prediction model to a plurality of subsets of the test sequence; and
    identifying one or more of the events in the test sequence having a criticality exceeding a threshold value of criticality as the one or more critical events.

4. The method of claim 3, wherein determining the criticality of a particular event in the test sequence comprises:
    calculating a first conversion propensity difference for the particular event based on a first subset of test sequence and a second subset of test sequence;
    calculating a second conversion propensity difference for the particular event based on the second subset of test sequence and a third subset of test sequence that does not include the particular event; and
    determining the criticality of the particular event as a difference between the first conversion propensity difference and the second conversion propensity difference.

5. The method of claim 4, wherein
    the first subset of test sequence comprises the particular event and events in the test sequence that are in the second stage and prior to the particular event;
    the second subset of test sequence comprises the events in the test sequence that are in the second stage and prior to the particular event; and
    the first conversion propensity difference is determined by applying the stage prediction model on the first subset of test sequence and on the second subset of test sequence.

6. The method of claim 5, wherein
    the third subset of test sequence comprises events in the second subset of test sequence and an event following the particular event in the test sequence; and
    the second conversion propensity difference is determined by applying the stage prediction model on the second subset of test sequence and on the third subset of test sequence.

7. The method of claim 2, wherein identifying one or more critical events comprises:
    identifying a plurality of test sequences from a plurality of sequences of events associated with a plurality of users, wherein each of the plurality of test sequences comprises a focus event;

for each of the test sequences,
  calculating a first conversion propensity difference for a first subset of the test sequence that includes the focus event;
  calculating a second conversion propensity difference for a second subset of the test sequence that does not include the focus event;
  determining a first distribution of the first conversion propensity difference based on the first conversion propensity differences generated for the plurality of test sequences;
  determining a second distribution of the second conversion propensity difference based on the second conversion propensity differences generated for the plurality of test sequences; and
  determining that the focus event is a critical event in response to determining that the first conversion propensity difference is higher or lower than the second conversion propensity difference based on the first distribution and the second distribution.

8. The method of claim 7, wherein determining that the first conversion propensity difference is higher or lower than the second conversion propensity difference is performed by applying a hypothesis testing on the first distribution and the second distribution.

9. A system comprising:
a host system configured for:
  hosting an online platform configured for presenting user interfaces to users, and
  modifying user interfaces presented to a user through the online platform based, at least in part, on a current engagement stage of the user with the online platform identified based on interaction data associated with the user describing interactions of the user with the online platform; and
an online experience evaluation system comprising:
  one or more processing devices configured for performing operations comprising:
    applying a stage prediction model based on the interaction data associated with the user to identify the current engagement stage of the user with the online platform, wherein the stage prediction model is configured to generate a propensity of the user being at a highest engagement stage, and wherein the current engagement stage of the user is determined based on the propensity; and
    identifying one or more critical events for promoting the user to transition from one engagement stage to a higher engagement stage based, at least in part, upon the interaction data associated with the user; and
  a network interface device configured for transmitting the identified current engagement stage of the user or the identified one or more critical events to the online platform.

10. The system of claim 9, wherein the operations further comprise:
pre-processing the interaction data to generate an event stream that comprises a sequence of events corresponding to the interactions of the user with the online platform and contextual features associated with each event in the sequence of events.

11. The system of claim 10, wherein identifying one or more critical events comprises:
identifying a plurality of test sequences from a plurality of sequences of events associated with a plurality of users, wherein each of the plurality of test sequences comprises a focus event;
for each of the test sequences,
  calculating a first conversion propensity difference for a first subset of the test sequence that includes the focus event;
  calculating a second conversion propensity difference for a second subset of the test sequence that does not include the focus event;
  determining a first distribution of the first conversion propensity difference based on the first conversion propensity differences generated for the plurality of test sequences;
  determining a second distribution of the second conversion propensity difference based on the second conversion propensity differences generated for the plurality of test sequences; and
  determining that the focus event is a critical event in response to determining that the first conversion propensity difference is higher or lower than the second conversion propensity difference based on the first distribution and the second distribution.

12. The system of claim 11, wherein determining that the first conversion propensity difference is higher or lower than the second conversion propensity difference is performed by applying a hypothesis testing on the first distribution and the second distribution.

13. A non-transitory computer-readable medium having program code that is stored thereon, the program code executable by one or more processing devices for performing operations comprising:
obtaining interaction data associated with a user of an online platform, the interaction data describing actions performed by the user with respect to the online platform and context data associated with each of the actions;
identifying a current engagement stage of the user with the online platform by applying a stage prediction model based on the interaction data associated with the user, wherein the stage prediction model is configured to generate a propensity of the user being at a highest engagement stage, and wherein the current engagement stage of the user is determined based on the propensity;
identifying one or more critical events for promoting the user to transition from one engagement stage to a higher engagement stage based, at least in part, upon the interaction data associated with the user; and
causing at least one of the identified current engagement stage of the user or the identified one or more critical events to be accessible by the online platform, wherein the at least one of the identified current engagement stage of the user or the identified one or more critical events is usable for changing user interfaces presented on the online platform to improve a likelihood of the user to transition from the current engagement stage to a higher engagement stage.

14. The non-transitory computer-readable medium of claim 13, wherein the operations further comprise:
pre-processing the interaction data to generate an event stream that comprises a sequence of events corresponding to the actions performed by the user with respect to the online platform and contextual features associated with each event in the sequence of events.

15. The non-transitory computer-readable medium of claim 14, wherein identifying one or more critical events comprises:
   determining an engagement stage of the user associated with each event in the sequence of events;
   determining a stage transitioning event in the sequence of events for the user by identifying an event that is associated with a first stage and whose previous event is associated with a second stage, wherein the first stage and the second stage are different;
   forming a test sequence by including, at least, the stage transitioning event and a plurality of events that associated with the second stage;
   determining a criticality for each event in the test sequence by applying the stage prediction model to a plurality of subsets of the test sequence; and
   identifying one or more of the events in the test sequence having a criticality exceeding a threshold value of criticality as the one or more critical events.

16. The non-transitory computer-readable medium of claim 15, wherein determining the criticality of a particular event in the test sequence comprises:
   calculating a first conversion propensity difference for the particular event based on a first subset of test sequence and a second subset of test sequence;
   calculating a second conversion propensity difference for the particular event based on the second subset of test sequence and a third subset of test sequence that does not include the particular event; and
   determining the criticality of the particular event as a difference between the first conversion propensity difference and the second conversion propensity difference.

17. The non-transitory computer-readable medium of claim 16, wherein
   the first subset of test sequence comprises the particular event and events in the test sequence that are in the second stage and prior to the particular event;
   the second subset of test sequence comprises the events in the test sequence that are in the second stage and prior to the particular event; and
   the first conversion propensity difference is determined by applying the stage prediction model on the first subset of test sequence and on the second subset of test sequence.

18. The non-transitory computer-readable medium of claim 17, wherein
   the third subset of test sequence comprises events in the second subset of test sequence and an event following the particular event in the test sequence; and
   the second conversion propensity difference is determined by applying the stage prediction model on the second subset of test sequence and on the third subset of test sequence.

\* \* \* \* \*